United States Patent Office 3,247,373
Patented Apr. 19, 1966

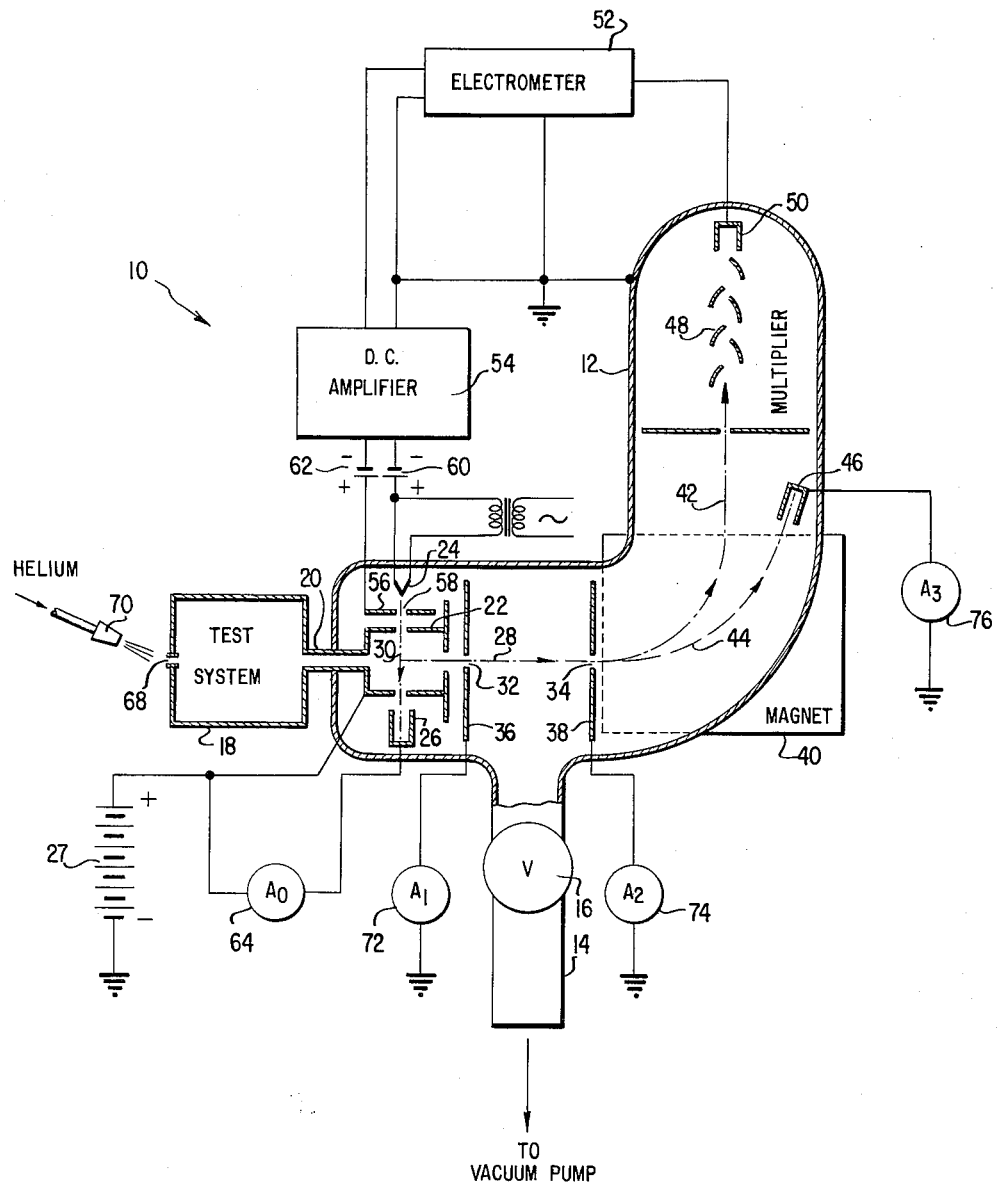

3,247,373
MASS SPECTROMETER LEAK DETECTOR WITH MEANS FOR CONTROLLING THE ION SOURCE OUTPUT
Richard F. Herzog, Lexington, Gerhard Sauermann, Burlington, and William J. McMahon, Watertown, Mass., assignors to GCA Corporation, a corporation of Delaware
Filed Dec. 18, 1962, Ser. No. 245,571
11 Claims. (Cl. 250—41.9)

This invention relates to mass spectrometers and more particularly to an improved read-out system for leak detectors of the helium mass spectrometer type.

Mass spectrometers consist of an ion source, a beam collimator, a mass analyzer and an ion detector. The ion source is usually of the electron impact type in which electrons from a hot filament, after being accelerated by a field of about 100 volts, collide with gas molecules to produce ions. The beam collimator consists of two slits, the entrance slit of the analyzer and the aperture slit, which are both metal discs with rectangular openings. In the present invention these discs are mounted on insulators in order to be usable for collecting and measuring the fraction of the ion beam which does not pass through the openings. The mass analyzer of the present invention can either be of the magnetic type or the radio frequency acceleration type or the quadruple focusing type. The ion detector can either be a simple Faraday cage or an electron multiplier or some optical transformation device.

In conventional helium leak detectors, after the mass spectrometer has been adjusted to the helium peak, the output current is essentially proportional to both the helium partial pressure in the source and to the ionizing electron current. If the system to be tested contains a single leak through which either air or helium is admitted, then the helium partial pressure may vary over more than five orders of magnitude. This, in the past, has required multiple range switching which, in practice, is awkward and inconvenient to perform. The utilization of a logarithmic amplifier solves the switching problem but still does not prevent the multiplier from being overloaded. Furthermore, deactivation caused by deposits during high current operation limits the useful life of the multiplier.

The novel system of the present invention avoids the above mentioned difficulties by providing an automatic feedback arrangement to keep the output current of the mass spectrometer constant through variation of the ionizing electron current. Through this arrangement it is possible to provide a measuring device which covers an extremely wide range of leaks without range switching, thereby having the highest sensitivity for the smallest leaks and reduced sensitivity for larger leaks to protect the instrument against overloads. Furthermore, the system of the present invention permits the direct measurement of the relative helium concentration, independent of the total pressure in the test system, and is, therefore, particularly well suited for the detection of extremely small leaks by the use of a pressure accumulation method.

Another important feature of this invention is to protect the electrodes of the ion source from intense helium bombardment which would contaminate these electrodes, increase the background and reduce the sensitivity.

It is, therefore, one object of the present invention to provide a novel mass spectrometer.

Another object of the present invention is to provide a novel leak detector of the helium mass spectrometer type.

Another object of the present invention is to provide a novel helium leak detector read-out system.

Another object of the present invention is to provide a novel leak detector particularly suited for use in detecting small leaks.

Another object of the present invention is to provide a leak detector having increased sensitivity and a broader range.

These and further objects and advantages of the invention will be more apparent upon reference to the following specification, claims and appended drawings wherein:

The single figure of the drawing shows in schematic form a leak detector of the helium mass spectrometer type constructed in accordance with the present invention.

Referring to the drawing, there is shown a leak detector generally indicated at 10, comprising an evacuated envelope 12 connected to a suitable vacuum pump by way of conduit 14 and valve 16. The evacuated envelope 12 is also connected to the system under test illustrated at 18 by way of a second conduit 20. The conduit 20 supplies vapor or gas from the test system 18 to the ion source of the leak detector which is of the well-known electron impact type. The ion source includes the usual ion chamber 22, heated filament 24, and electron collector or trap 26. A battery 27 is provided for positive operating potential to the ion chamber 22 and the electron trap 26. Electrons which are emitted from the hot filament 24, after being accelerated by a field of about 100 volts in a conventional manner, collide with the molecules in the gas or vapor entering the ion chamber by way of conduit 20 to produce an ion beam 28. The electron beam 30 from the hot filament passes transversely of the ion beam through the ion chamber 22 and is collected at trap 26.

The ion beam 28 passes through the beam collimator consisting of the analyzer entrance slit 32 and the aperture slit 34. The slits 32 and 34 are each provided in insulated metal discs 36 and 38 suitably maintained at conventional operating potentials. The ion beam is then deflected in the mass analyzer in a well known manner by a permanent magnet 40 so as to separate into two components, namely a helium ion beam 42 and a nitrogen ion beam 44. Nitrogen beam 44 passes to a suitable collector 46 in the ion detector portion of the spectrometer while the helium beam 42 passes through a conventional electron multiplier 48 to output collector 50. The signal from output collector 50 passes through a conventional electrometer 52 and is fed back to the ion source by way of a D.C. amplifier 54.

In the present invention, the output signal from collector 50 is maintained at a substantially constant value by means of the feedback through electrometer 52 and D.C. amplifier 54 of such a polarity as to appropriately vary the electron ionizing beam 30. This can be done in either of two ways; that is, by regulating the heater current to filament 24 or by regulation of the filament bias voltage. However, in the preferred embodiment illustrated in the drawing, electron current regulation is accomplished in a third manner utilizing an insulated metal disc 56 having a rectangular aperture 58. More specifically, the signal from D.C. amplifier 54 controls the bias of the space charge aperture or slit 58.

As illustrated in the drawings, the heated filament 24 is supplied with a suitable bias from a power supply such as illustrated by the battery 60. The disc 56 is similarly biased at a potential near the potential of the filament by a second battery 62. The output from amplifier 54 is supplied to the disc 56 and is super-imposed on the bias signal from battery 62 to vary the potential of the disc 56 and hence the intensity of the electron beam 30. The action of the disc 56 and slit 58 in controlling the electron current 30 is similar to the action of the grid in a regular triode, a more negative potential of the disc 56 acting to reduce the electron current. If desired, the slit and disc may be replaced by a grid or by an electrode partially surrounding the filament.

The magnitude of the current passing to the collector 26 is read from the suitable ammeter 64 connected to read the collector electron current $A_0$. The potential of the disc 56, or better the difference against the corresponding voltage for zero leak rate, can be calibrated as a function of the helium partial pressure. Naturally, as in all feedback loops, the regulating multiplier output current to collector 50 cannot be kept exactly constant since this would remove the driving force from the feedback loop. Nevertheless, due to the high amplification in the feedback loop, particularly as provided by D.C. amplifier 54, the change in multiplier output can be kept negligibly small.

Although control of the space charge requires an additional electrode 56, it possesses important advantages over a system involving the control of the filament heater voltage or current since it provides the regulation of a potential to the electrode 56 with essentially no load. In addition to this, it does not affect the relative sensitivity of the device for the different components of a gas to be analyzed. The output voltage of the D.C. amplifier 54 is poled to bias the electrode 56 in such a way that an increase of the output current from the collector 50 makes the potential of electrode 56 more negative and correspondingly more positive if the output from collector 50 decreases.

In the drawing, the evacuated test system 18 is illustrated as having a leak 68. A probe 70 providing gaseous helium is passed over the outer surface of the test system until the leak 68 is reached and some of the helium from the probe passes through the leak to the interior of the test system. The additional helium in the system produces additional helium ions in the beam 28 tending to increase the output of collector 50. However, this increase is opposed by the feedback to electrode 56 lowering the potential of this electrode and decreasing the intensity of electron beam 30 so as to produce less ions and maintain the output at collector 50 substantially constant. The increase of helium in the system as the probe 70 nears the leak 68 is detected by ammeter 64 which senses the corresponding decrease in the electron current to trap 26. This change in current to ammeter 64 is inversely proportional to the increase in helium molecules in the test system.

While described in conjunction with a leak detector, the read-out system of the present invention may be used with any mass spectrometer and is particularly valuable for the analysis of trace impurities. One of the major difficulties inherent in such instruments is the extremely wide range of output currents, commonly eight orders of magnitude or even more. In normal arrangements, the scanning speed must be drastically reduced to permit multiple range switching and to allow sufficient time for recovery after the amplifier has been overdriven by the main peaks. However, the novel feedback system of the present invention described above eliminates these difficulties in providing maximum sensitivity for trace impurities and instrument protection for the main peaks, thus permitting a much faster speed of scanning.

While usable for relatively large leaks as described above, the present invention is also particularly suited for use in the detection of very small leaks through the use of the pressure accumulation method. In this case, the valve 16 which remained open in the test previously described is now closed. With the valve 16 closed, the mass spectrometer is disconnected from the vacuum pump and all the gas that leaks in during an extended period of time stays in the system and is available for analysis.

Assuming that the main source for any pressure build-up during the initial search by the probe 70 for the leak 68 is air leaking into the system, then it must be expected that both the total pressure and the helium partial pressure will increase linearly with time due to the helium content of the air. This steady increase of the helium peak in any conventional leak detector is a serious drawback for the use of the pressure accumulation method. However, the instrument of the present can be used to measure the ratio between the total pressure and the helium partial pressure and eliminates the above-mentioned difficulty since this ratio will stay constant as long as only air is leaking into the system but changes immediately as soon as the helium from the test nozzle reaches the leak. This ratio may be obtained by taking readings from any one or more of the additional ammeters 72, 74 or 76.

In this system of the present invention, the entrance disc 36 is insulated from its support and its rectangular aperture 32 is preferably made smaller than the ion beam 28. As a result, the disc 36 collects a constant fraction of the total ion beam. The current collected by this electrode is, therefore, proportional to the product of electron current times total pressure and since the helium peak is kept constant by feedback is also proportional to the ratio of total pressure to helium partial pressure. This current can be read by ammeter 72. The following example illustrates this operation.

First, consider the case when the total pressure and the helium partial pressure are both increased to twice their original value as may happen during the initial search for the leak. The feedback loop acts to reduce the ionizing electron current beam 30 to half its value in order to keep the helium peak constant. The total ion current in beam 28 therefore stays constant since twice the total pressure and half the ionizing electron current just compensate each other.

Next consider the case where the leak has been found and only the helium partial pressure is increased to twice its value whereas the total pressure increase is negligible. In this case, too, the feedback loop acts to reduce the ionizing current to half its value because of its sensitivity to only helium ions. But, now since the total pressure is essentially constant (the increase is negligible), the total ion current drops to half its value. Therefore, during the leak testing with the pressure accumulation method, the ion current $A_1$ read by meter 72 measured on the entrance slit 36 stays constant as long as the leak has not been found regardless of the pressure increase in the system but drops to a small fraction of its normal value as soon as test helium penetrates through the leak. Maximum change is observed for small leaks whereas large leaks actually reduce the ion current practically to zero without any harm to the instrument.

The collection of the fraction of total ion current can be done either on the entrance slit analyzer disc 36 (current $A_1$) or at the aperture limiting disc 38 in front of the magnetic field (current $A_2$). In the latter case, the disc 38 must be similarly insulated and the rectangular slit 34 made smaller than the ion beam so as to collect to constant fraction of the beam.

Finally, the fraction of the total ion current can be read by ammeter 76 (current $A_3$) at the nitrogen collector 46 located after the magnetic field which collector is adjusted to receive $N_2$ ions. This latter collection arrangement involving ammeter 76 although slightly more complicated has the advantage of being less affected by contaminants released by outgassing.

It is apparent from the above that the present invention provides a novel mass spectrometer incorporating a feedback loop which acts to increase the sensitivity and significantly broaden the range of use of the spectrometer without the necessity for elaborate control and switching equipment. While usable in all types of mass spectrometer systems the present invention is particularly suited to leak detectors and presents special advantages for detecting small leaks by means of a pressure accumulation method. An important feature of the present invention is the provision of a feedback loop which senses variations in the output current and feeds these variations back to the ion source in such a way as to vary the electron current in a direction tending to maintain the output signal substantially constant. The system covers an extremely wide range of leaks without range switching so that the device has highest sensitivity for the smallest leaks and acts to automatically protect the instrument against overload. Furthermore, it permits the direct measurement of the relative helium or other suitable test gas concentration independent of the total pressure in the test system.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A mass spectrometer comprising a source of gas molecules, a pair of electrodes for generating an electron beam to impinge upon said gas molecules, a third electrode for controlling the intensity of said electron beam, an ion detector, and means for maintaining the output of said ion collector substantially constant including feedback means coupling said ion detector to said third electrode whereby a change in the output current from said ion detector produces a change in the potential of said third electrode and a corresponding opposite change in the intensity of the electron beam.

2. A spectrometer according to claim 1 wherein said pair of electrodes comprise a cathode filament and an electron collector or trap.

3. A spectrometer according to claim 2 wherein said third electrode comprises an apertured metal disc positioned adjacent said filament.

4. A leak detector comprising an evacuated envelope, an ion source, a beam collimator and an ion detector mounted in said envelope, a mass analyzer positioned between said collimator and said ion detector, valve means for connecting said envelope to a vacuum pump, means for coupling said envelope to a test system, an electrometer coupled to the output of said ion detector, and a D.C. amplifier coupling the output and said electrometer to said ion source whereby variations in the output of said ion detector are fed back to said ion source to vary the output of said ion source in the proper direction and sufficiently to maintain the output of said ion detector substantially constant.

5. A detector according to claim 4 including a helium probe for ascertaining leaks in said test system.

6. A leak detector comprising an ion source, an ion detector, feedback means coupling said ion detector to said ion source, said feedback means acting to vary the output of said ion source in the proper direction to maintain the output of said ion detector substantially constant, means for collecting a constant fraction of the total ions from said source, and means for measuring the current produced by said constant fraction of ions.

7. A detector according to claim 6 wherein said ion fraction collecting means comprises a second ion detector.

8. A detector according to claim 6 wherein said source produces an ion beam and said ion fraction collecting means comprises an insulated disc having an aperture of smaller area than the cross sectional area of said beam.

9. A detector according to claim 8 wherein said aperture acts as the entrance slit of a beam collimator.

10. A detector according to claim 8 wherein said aperture acts as the aperture slit of a beam collimator.

11. A leak detector comprising an evacuated envelope, an ion source, a beam collimator and an ion detector mounted in said envelope, a mass analyzer positioned between said collimator and said ion detector, means for coupling said envelope to a test system acting as a source of gas molecules, said ion source comprising a pair of electrodes for generating an electron beam to impinge upon said gas molecules, a third electrode for controlling the intensity of said electron beam, valve means for connecting said envelope to a vacuum pump, an electrometer coupled to the output of said ion detector, and a D.C. amplifier coupling the output and said electrometer to said third electrode whereby a change in the output current from said ion detector produces a corresponding opposite change in the electron current by variation of the potential of said third electrode, means for measuring the intensity of said electron beam, means for collecting a constant fraction of the total ions from said source, and means for measuring the current produced by said constant fraction of ions.

References Cited by the Examiner

UNITED STATES PATENTS

| | | | |
|---|---|---|---|
| 2,651,723 | 9/1953 | Baker | 250—41.9 |
| 2,743,370 | 4/1956 | McLaren et al. | 250—41.9 |
| 2,829,259 | 4/1958 | Foner et al. | 250—41.9 |
| 2,890,336 | 6/1959 | Meyerson et al. | 250—41.9 |
| 2,890,338 | 6/1959 | Wright | 250—41.9 |
| 2,994,776 | 8/1961 | Mott | 250—84.5 |

OTHER REFERENCES

"Mass Spectrometer for Leak Detection," by A. O. Nier et al., Journal of Applied Physics, vol. 18, 1947, pages 30 to 33.

RALPH G. NILSON, *Primary Examiner.*